(12) United States Patent
Mulcahey

(10) Patent No.: US 6,776,539 B2
(45) Date of Patent: Aug. 17, 2004

(54) CAMERA BRACKET

(76) Inventor: Timothy G. Mulcahey, 31 Eaglewood Ave., Worcester, MA (US) 01603

(*) Notice: Subject to any disclaimer, the term of this patent is extended or adjusted under 35 U.S.C. 154(b) by 0 days.

(21) Appl. No.: 10/436,026

(22) Filed: May 12, 2003

(65) Prior Publication Data

US 2004/0052516 A1 Mar. 18, 2004

Related U.S. Application Data

(63) Continuation of application No. 09/854,892, filed on May 14, 2001, now abandoned.

(51) Int. Cl.[7] .............................................. G03B 17/00
(52) U.S. Cl. ...................................... 396/422; 396/428
(58) Field of Search ................................ 396/422, 419, 396/420, 421

(56) References Cited

U.S. PATENT DOCUMENTS

| | | | | |
|---|---|---|---|---|
| 2,614,471 A | * | 10/1952 | Joseph | 396/422 |
| 3,550,519 A | * | 12/1970 | Lewis | 396/422 |
| 4,104,623 A | * | 8/1978 | Sloop | 396/422 |
| 4,187,021 A | * | 2/1980 | Balser | 396/422 |
| 4,198,150 A | * | 4/1980 | Sloop | 396/422 |
| 4,255,036 A | * | 3/1981 | Pincetich | 396/422 |
| 4,319,825 A | * | 3/1982 | Newton | 396/422 |
| 4,752,794 A | * | 6/1988 | Bohannon | 396/189 |
| 4,866,465 A | * | 9/1989 | Gallegos | 396/189 |
| 5,528,325 A | * | 6/1996 | Perez | 396/155 |
| 6,000,859 A | * | 12/1999 | Mulcahy et al. | 396/422 |

OTHER PUBLICATIONS

Stroboframe Catalog, Flash Brackets and Accessories, 1992, 16 pages.*
Just Rite Bracket Company Advertisement, Date Unknown, 2 pages.*
Newton Catalog, N3001 NR Rigid Non Rotator Camera Bracket, Date Unknown, 4 pages.☐☐.*
Newton Catalog, N3000 CR Camera Rotator, Date Unknown, 4 pages.☐☐.*
Photographic Magazine, Item No. 35, Aug. 1997, p. 67.*
Stroboframe Advertisement, Range Finder Magazine, Oct. 1996, p. 29.*
Stroboframe Catalog, Flash Bracket and Accessories, 1996, 14 pages.*

* cited by examiner

*Primary Examiner*—Russell Adams
*Assistant Examiner*—Rochelle Blackman
(74) *Attorney, Agent, or Firm*—Steven W. Fox, Esq.

(57) ABSTRACT

The present invention is a bracket for use with a camera and a flash unit. The bracket comprises a base support member having a mounting portion adapted to engage with the bottom surface of the camera and a vertical support member having a first end portion engaged to the base support member and a second end portion. The bracket further comprises a horizontal support member having a first end portion engaged to the second end portion of the vertical support member and a second end portion. The bracket further comprises a flash unit support arm having a first end portion rotatably engaged to the second end portion of the horizontal support member between a first position wherein the second end portion of the flash unit support arm is closer to the vertical support arm relative to the first end portion of the flash unit support arm to allow the person to orientate the bracket to take a horizontal photograph and a second position wherein the second end portion of the flash unit support arm is closer to the vertical support arm relative to the first end portion of the flash unit support arm to allow the person to orientate the bracket to take a vertical photograph. The bracket further comprises a first handle member engaged with the base support member and disposed below the camera and in close proximity to the center of gravity of the bracket so that in the first position the person may with a single hand grasp the first handle member to support the bracket to take a horizontal photograph.

20 Claims, 3 Drawing Sheets

CAMERA BRACKET

CROSS-REFERENCE TO RELATED APPLICATION

This application is a continuation of and claims priority to application Ser. No. 09/854,892 filed on May 14, 2001, now abandoned.

BACKGROUND OF THE INVENTION

Professional photographers use expensive cameras and flash units to obtain a high quality photographic image. A few brackets have been developed that support the camera and allow the photographer to orientate the bracket to take a horizontal or a vertical photograph. Such conventional brackets have several drawbacks. For example, such conventional brackets do not allow the professional photographer to grasp the bracket in a balanced and secure manner to comfortably and reliably orientate the camera to take a horizontal or a vertical photograph. Such conventional brackets due not adequately support the camera during extensive use and orientation. With such conventional brackets, the camera due to its weight is allowed to deflect from the bracket thereby creating a situation where the camera may become damaged and/or where the photographer cannot take consistent vertical photographs.

SUMMARY OF THE INVENTION

The present invention is a bracket for use with a camera and a flash unit. The bracket comprises a base support member having a mounting portion adapted to engage with the bottom surface of the camera and a vertical support member having a first end portion engaged to the base support member and a second end portion. The bracket further comprises a horizontal support member having a first end portion engaged to the second end portion of the vertical support member and a second end portion. The bracket further comprises a flash unit support arm having a first end portion rotatably engaged to the second end portion of the horizontal support member between a first position wherein the second end portion of the flash unit support arm is closer to the vertical support arm relative to the first end portion of the flash unit support arm to allow the person to orientate the bracket to take a horizontal photograph and a second position wherein the second end portion of the flash unit support arm is closer to the vertical support arm relative to the first end portion of the flash unit support arm to allow the person to orientate the bracket to take a vertical photograph. The bracket further comprises a first handle member engaged with the base support member and disposed below the camera and in close proximity to the center of gravity of the bracket so that in the first position the person may with a single hand grasp the first handle member to support the bracket to take a horizontal photograph.

BRIEF DESCRIPTION OF THE DRAWINGS

The following description of the invention will be more fully understood with reference to the accompanying drawings in which.

DETAILED DESCRIPTION OF THE INVENTION

Figure 1:
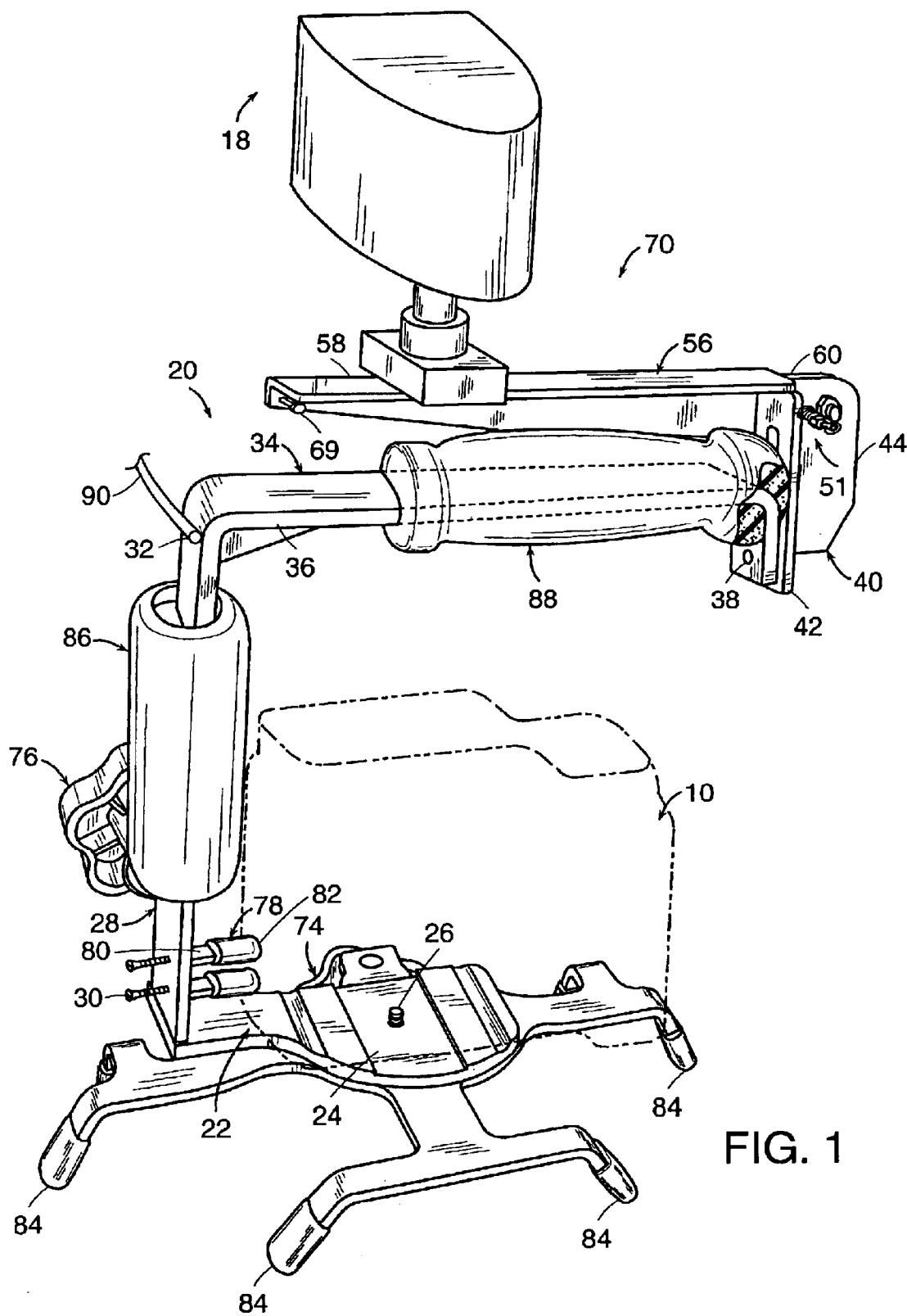
FIG. 1 is a perspective view of a first embodiment of the camera bracket of the present invention depicted in a first operable position where the person may take a horizontal photograph.
Figure 2:
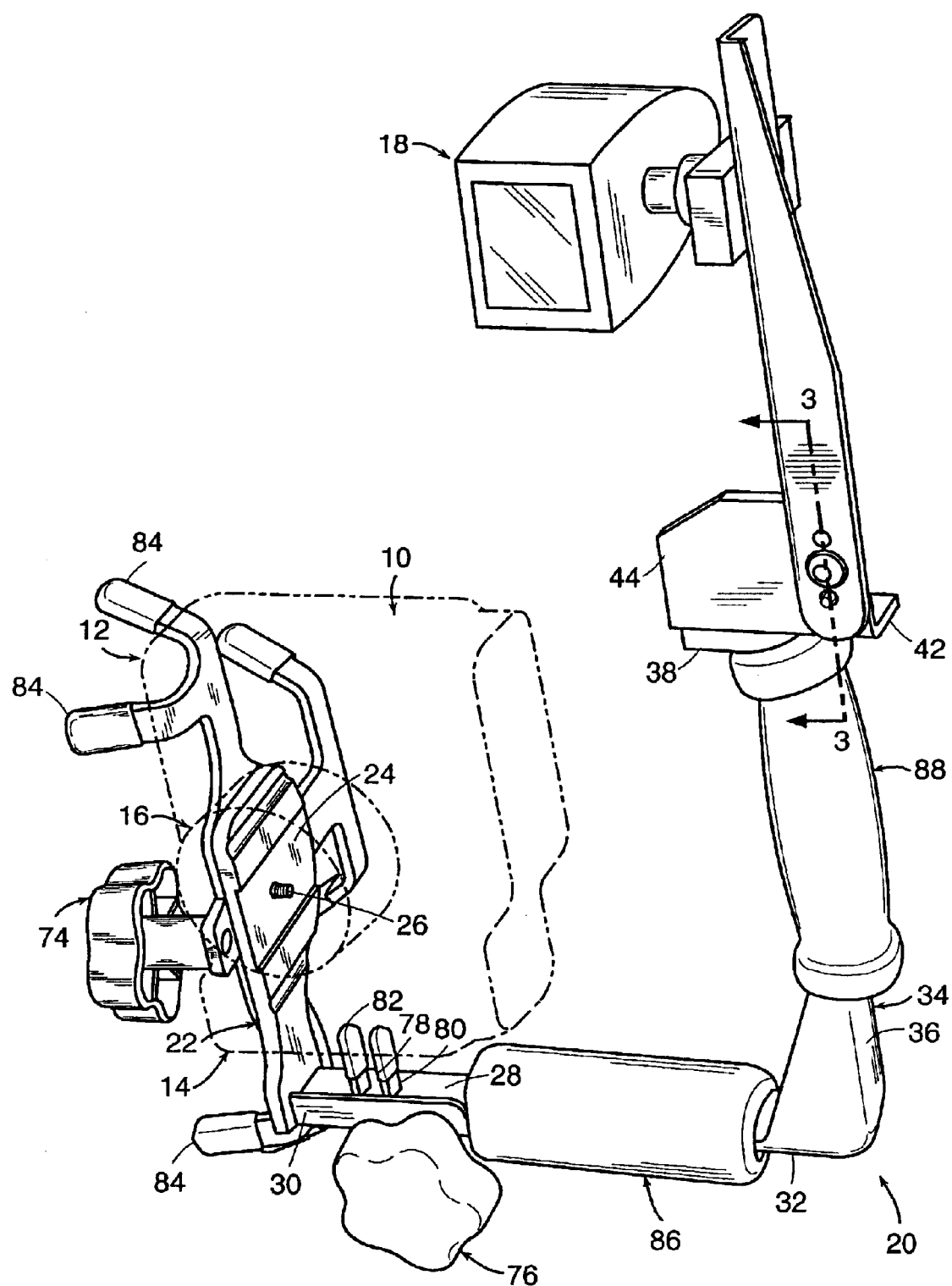
FIG. 2 is a perspective view of the camera bracket of the present invention depicted in a second operable position where the person may take a vertical photograph.
Figure 3:
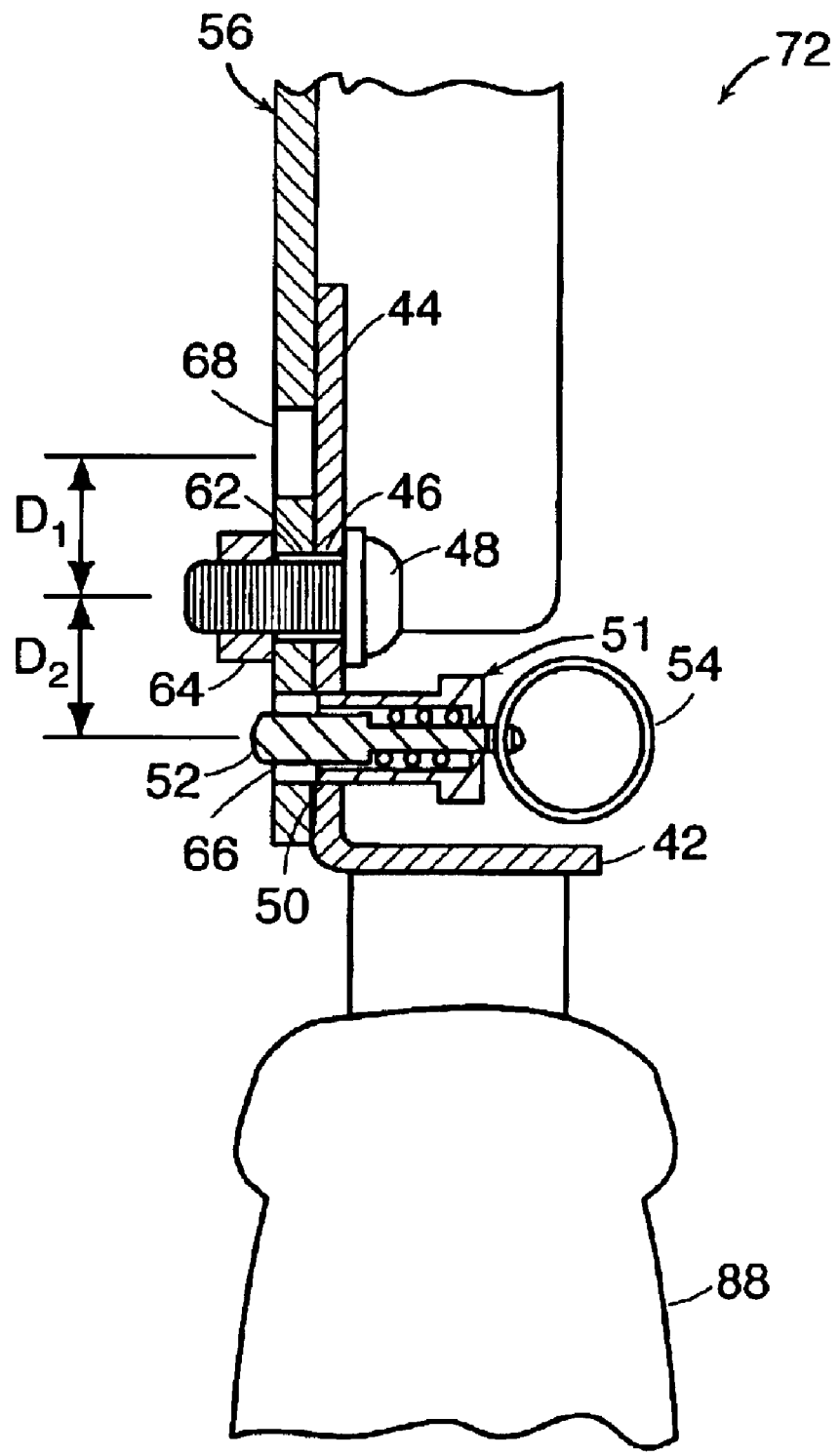
FIG. 3 is a cross-section view taken along lines 3—3 of FIG. 2 showing the flash unit support arm rotatably connected to the mounting bracket and secured in a second operable position by use of an index plunger.

Referring to FIGS. 1–3, the present invention is a bracket 20 for use with a camera 10 and a flash unit 18. The camera 10 includes a bottom surface 12, a side surface 14, and a lens 16.

In one embodiment, the bracket 20 comprises a base support member 22 having a mounting portion 24 adapted to engage with the bottom surface 12 of the camera by a fastener such as a machine screw 26.

The bracket 20 further comprises a vertical support member 28 having first and second end portions 30 and 32. The first end portion 30 is engaged to the base support member 22. In the embodiment shown, the vertical support member 28 is substantially perpendicular to the base support member 22.

The bracket 20 further comprises a horizontal support member 34 having first and second end portions 36 and 38. The first end portion 36 is engaged to the second end portion 32 of the vertical support member 28. In the embodiment shown, the horizontal support member 34 is substantially perpendicular to the vertical support member 28 and parallel to the base support member 22.

The bracket 20 further comprises a mounting bracket 20 having first and second sidewalls 42 and 44. Sidewall 42 is connected to the second end portion 38 of the horizontal support member 34. The second sidewall 44 comprises a first opening 62 through which a bolt 48 is passed there thru. The second side wall 44 further comprises a second opening 66 The bracket 20 further comprises an index plunger 51 secured by threads into the second opening 66 and having a pin body 52 and a handle 54. The index plunger 51 is available from J. W. Winco, Inc., 2815 S. Calhoun Road, New Berlin, Wis. 53151 as Part No. GN607. Pulling of the handle 54 causes the pin body 52 to retract to a biased state.

The bracket 20 further comprises a flash unit support arm 56 moveably engaged to the second end portion 38 of the horizontal support member 34. In the embodiment shown, the flash unit support arm 56 is rotatably engaged with the horizontal support member 34. The flash unit support arm 56 extends from a first end portion 58 to a second end portion 60 which is adapted to mount the flash unit 18. The flash unit support arm 56 comprises a handle member 69 which can be operated by the person to move the flash unit support arm 56 a first position 70 where the flash unit support arm 56 extends inward to the vertical support member 28 to allow the person to orientate the bracket 20 and camera 10 to take a horizontal photograph to a second position 72 where the flash unit support arm 56 extends outward from the vertical support member 28 to allow the person to orientate the bracket 20 to take a vertical photograph. The flash unit support arm 56 further comprises a first opening 62 located in proximity to the second end portion 60. The bolt 48 passes through the first opening 46 of the mounting bracket 40 and the first opening 62 of the second end portion 60 so that the flash unit support arm 56 may be rotated with respect to the second sidewall 44 of the mounting bracket 40. The bolt 58 is secured by a fastener such as a nut 64. The flash unit support arm further comprises second and third openings spaced from the first opening 62 by distances D1 and D2, respectively. In the embodiment shown, the distance D1 is equal to the distance D2 thereby allowing the second and third openings 66 and 60 to align with the second opening 50 of the mounting bracket 40. Withdrawal of the pin body 52 by pulling of the pin handle 54 allows the flash unit support arm 56 to rotate about the second end portion 60 of the mounting bracket 40. Upon release of the pin handle 54, the flash unit support arm 56 may be selectively rotated by the person to the first position 70 where the second opening 50 of the mounting bracket 40 is aligned with the second opening 66 or to the second position 72 where the second opening 50 of the mounting bracket 40 is aligned with the third opening 68 of the flash unit support arm 56.

The bracket 20 may further comprise a first handle member 74 engaged with the base support member 22 and a second handle member 76 engaged with the vertical support member 28. The first and second handle members 74 and 76 extend outward from the base support member 22 and the vertical support member 28, respectively. The first and second handles members 74 and 76 are preferably in the shape of a knob or other ergonomic shape to allow the person to comfortable and securely grasp the first and second handle members 74 and 76 within the palm of the person's hand so that the person with a single hand may grasp either the first or the second handle member 74 and 76 (depending upon orientation) to concurrently support the bracket and adjust the lens or focus the camera. The first and second handle members 74 and 76 may be screwed into the base support member 22 and vertical support member 28, respectively, thereby allowing for outward extension of the handle members 74 and 76 to be increased or decreased as desired. When the bracket 20 is orientated to the first position 70, the first handle member 74 is disposed below the camera 10 and in proximity to and aligned with the center of gravity of the assembly so that person with a single hand may support and balance the bracket 20, and focus the camera, to take a horizontal photograph. When the bracket 20 is orientated to the second position 72, the second handle member 76 is disposed below the camera 10 and in proximity to and aligned with the center of gravity of the assembly so that person with a single hand may support and balance the bracket 20, and focus the camera, to take a vertical photograph.

The bracket 20 may further comprise a first camera support member 78 in bearing contact with the first side surface 14 of the camera 10 to prevent deflection of the camera 10 when the person orientates the bracket 20 to the second position 72 to take a vertical photograph. The first camera support member 78 has a first end portion 80 engaged with the vertical support member 28 and a second end portion 82 in close or bearing contact with the side surface 14 of the camera 10. Alternatively, the first end portion 80 of the first camera support member 78 may be engaged with the base support member 22 to likewise provide close or bearing contact with the side surface 14 of the camera 10. The length of the first camera support member 78 is adjustable to position the second end portion 82 in close or bearing contact with the side surface 14 of the camera 10.

The bracket 20 further comprises third and fourth handle members 86 and 88 engaged with the vertical support member 28 and the horizontal support member 34. Third and fourth members 86 and 88 are made from a foam cushion material and may be used by the person for non-operational purposes such as general carrying purposes.

The bracket 20 further comprises a plurality of legs 84 extending downward from the base support member 22 to support the bracket 20 on a surface.

The base support member 22, vertical support member 28, horizontal support member 34, mounting bracket 40, and the flash unit support arm 56 are made from a strong material such as steel and fabricated from bending and machining operations. Other materials such as polymers would be desirable if durable and strength could be achieved. The base support member 22, vertical support member 28, horizontal support member 34, and the mounting bracket 40 may be formed as a single piece of material or multiple pieces fastened together.

The bracket 20 may further comprise a strap 90 connected to the upper portion of the vertical support member 28 and adapted to be worn around the person's neck.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed is:

1. A bracket for use with a camera and a flash unit, the camera having a bottom surface and a side surface, the bracket comprises:
   (a) a base support member having a mounting portion engageable with the bottom surface of the camera;
   (b) a vertical support member having a first end portion engaged to said base support member and a second end portion;
   (c) a horizontal support member having a first end portion engaged to said second end portion of said vertical support member and a second end portion; and
   (d) a flash unit support arm having a first end portion and a second end portion engaged to said second end portion of said horizontal support member, said flash unit support arm being moveable between a first position where said first end portion of said flash unit support arm is closer to said vertical support arm relative to said second end portion of said flash unit support arm to allow the person to orientate the bracket to take a horizontal photograph, and a second position where said second end portion of said flash unit support arm is closer to said vertical support arm relative to said first end portion of said flash unit support arm to allow the person to orientate the bracket to take a vertical photograph.

2. The bracket of claim 1, further comprising a first handle member engaged with said base support member and extending outward from said base support member.

3. The bracket of claim 2, wherein said first handle member is disposed below the camera and in close proximity to the center of gravity of the bracket so that in said first position the person may with a single hand grasp said first handle member to support the bracket to take a horizontal photograph.

4. The bracket of claim 3, further comprising a mounting bracket having first and second sidewalls engaged with said second end portion of said horizontal support member and said first end portion of said flash unit support arm, respectively.

5. The bracket of claim 4, wherein said first end portion of said flash unit support arm is rotatably connected to said second sidewall of said mounting bracket.

6. The bracket of claim 5, wherein said flash unit support arm comprises a handle member to allow the person to rotate the flash unit support arm between said first position and said second position.

7. The bracket of claim 6, wherein said first end portion of said flash unit support arm comprises first and second openings.

8. The bracket of claim 7, further comprising an index plunger secured to said second side wall of said mounting bracket, said index plunger having a pin.

9. The bracket of claim 8, wherein said pin is engaged with said first opening when said flash unit support arm is moved to said first position.

10. The bracket of claim 9, wherein said pin is engaged with said second opening when said flash unit support arm is moved to said second position.

11. The bracket of claim 10, further comprising a first camera support member in bearing contact with the first side surface of the camera to prevent deflection of the camera when the person orientates the bracket to said second position to take a vertical photograph.

12. The bracket of claim 11, wherein said first camera support member has a first end portion engaged with said first support member and a second end portion in bearing contact with the first side of the camera.

13. The bracket of claim 12, wherein said first camera support member has a first end portion engaged with said base support member and a second end portion in bearing contact with the first side of the camera.

14. The bracket of claim 13, wherein said length of said first camera support member is adjustable to position said second end portion in bearing contact with the first side of the camera.

15. The bracket of claim 14, further comprising a plurality of legs extending downward from said base support member to support the bracket on a surface.

16. The bracket of claim 15, wherein said vertical support member is substantially perpendicular to said base support member.

17. The bracket of claim 16, wherein said horizontal support member is substantially perpendicular to said vertical support member and parallel to said base support member.

18. The bracket of claim 17, further comprising a second handle member engaged with said vertical support member and extending outward from said base support member and said vertical support member; in said second position said second handle member is disposed below the camera and in close proximity to the center of gravity of the bracket so the person may with a single hand grasp said second handle member to support the bracket to take a vertical photograph.

19. The bracket of claim 18, wherein said first and second handle members are in the shape of a knob.

20. The bracket of claim 19, wherein said first and second handle members can be adjusted to change the length of said first and second handle members from said base support member and said vertical support member, respectively.

* * * * *